Dec. 2, 1969             R. D. OGG             3,481,044

COMPASS

Filed May 6, 1966

INVENTOR.
ROBERT D. OGG

BY Kenway, Jenney + Hildreth

ATTORNEYS

United States Patent Office 3,481,044
Patented Dec. 2, 1969

3,481,044
COMPASS
Robert D. Ogg, North Edgecomb, Maine, assignor to The Eastern Company, Naugatuck, Conn., a corporation of Connecticut
Filed May 6, 1966, Ser. No. 548,173
Int. Cl. G01c 17/08
U.S. Cl. 33—223                    2 Claims

ABSTRACT OF THE DISCLOSURE

The invention comprises a magnetic compass having a card pivoted therein by a bearing cup and a pivot. The pivot is mounted by means of a pair of parallel, spaced-apart flexible diaphragms of elastomeric material. The peripheries of the diaphragms are fastened to the card, and the pivot is fastened to the centers of the diaphragms, thereby to isolate the cup and pivot point from damaging mechanical shocks.

---

This invention relates to compasses, and more particularly to compasses having means to minimize or eliminate damage to the pivot bearings thereof from shocks to which the compass may be subjected.

One of the problems encountered in the use of compasses is that of damage to the pivots or bearing points which support the compass indicator or card, if the compass as a whole is subjected to shocks such as might arise, for example, from the pounding of the boat using the compass during rough seas, or from the vibration encountered in some power boats when they are operated at high speeds or due to careless handling of a compass. Such damage, of course, may make the compass unsuitable for use thereafter. Attempts have been made in the past to provide means for minimizing such damage, but such means have not proved entirely satisfactory due to residual friction in the means used to provide a shock absorber between the base of the compass and the pivot points themselves. It is to be recognized that shock forces acting on a compass, while transient in nature, are high; and in spite of the transient nature of shocks, nevertheless any more than minimum inherent friction residual in the shock-absorbing means will in many instances permit transmission of the force of the shock directly to the pivot point of the compass, with resulting damage to the latter.

The above remarks are particularly true in respect to many of the compasses made today, where the bearing of the compass card or indicator is a pivot member having a sharp point, this point bearing against a jewel cup. The area of the point in contact with the jewel is extremely small, in order to eliminate undesired friction between the pivot and the jewel, and when even a minor shock is imposed on the pivoted bearing, the pressures at the pivot points are enormous; so high, in fact, that fracturing of the jewel itself, or blunting of the end of the pivot may often occur. In either case, such damage will cause increased friction in the pivot bearing, with probable resultant errors in compass readings.

Therefore, there is a need to provide a sensitive bearing mount for the compass card or indicator in which there is a minimum of friction in normal use, and which provides an essentially friction-free means for eliminating (or at least minimizing) the hazards of the aforementioned shocks. This invention is directed to a means of providing such a support.

In view of the above, among the several objects of the invention may be noted the provision of a sensitive mounting for a compass indicator or card which eliminates or at least minimizes deleterious shocks to the pivot point and jewel; the provision of a mounting of the above class in which there is compliance in an axial direction of the mounting but minimum compliance perpendicular to the axis of the bearing; the provision of a mount of the above classes in which maintenance is relatively easy; the provision of a mounting for a compass card or indicator, which has relatively small rotational friction, thus leading to sensitivity, but in which means are incorporated to protect the mounting against shocks; the provision of a compass of the above classes which has enhanced damping, but which retains the essential sensitivity of indication of a compass point reading; the provision of a simple and sensitive pivot mounting for a compass indicator or card, which is readily made and fool-proof in operation; and the provision of a compass pivot bearing of any of the above classes which is adaptable to all forms of compasses using a rotating indicator or compass card. Other objects and advantages will be in part obvious and in part pointed out hereinafter.

In the accompanying drawings.

Figure 1:
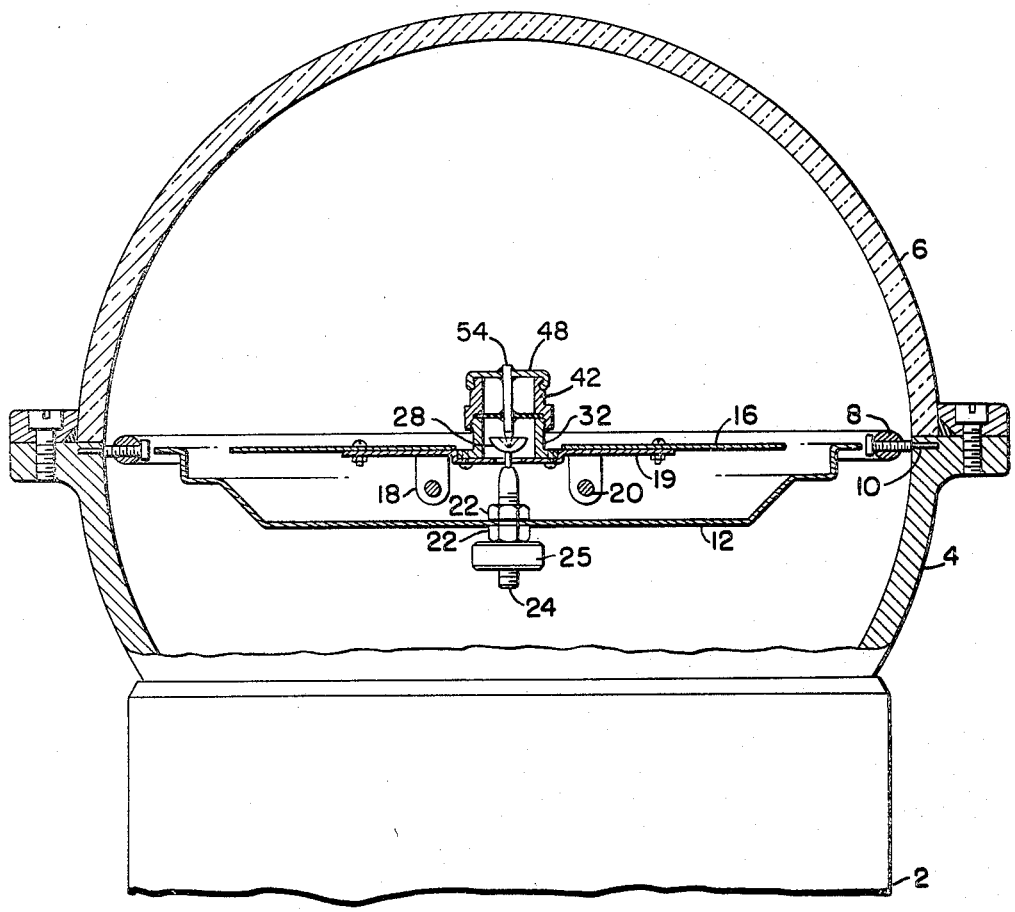
FIG. 1 is a pictorial view of a compass incorporating one embodiment of this invention.

Referring now to FIG. 1, there is shown a compass of a kind readily available on the market as to its general configuration and construction, but incorporating one embodiment of this invention. While a compass of this kind, otherwise known as an oil-damped hemispherical compass, is chosen to illustrate the invention, the latter is equally applicable to other forms of compasses as well as to the one shown in FIG. 1.

A complete description of the general compass shown in FIG. 1 will be found in U.S. Patent 2,428,346 issued Sept. 30, 1947 in the name of Wilfred Gordon White, and the teachings of that patent are incorporated herein by reference. In brief, the compass is mounted on a cup-shaped base 2 of brass, aluminum or other non-magnetic material only a portion of which is shown. Secured to the base by screws, for example, is a hemispherical shell or bowl 4. The bowl 4 may conveniently be of spun brass or other non-magnetic and otherwise suitable material. The upper edge of bowl 4 supports the lower edge of a glass hemisphere 6, the hemisphere being fitted to the upper edge of shell 4, and suitable retaining means are being provided (as shown) to provide a fluid-tight seal between the hemisphere 6 and the shell 4.

A first gimbal member 8 is pivoted by means of pivots 10 to the shell 4, this gimbal member being preferably made of aluminum and being carefully balanced. The second gimbal member 12 is pivoted by means of pivots 14 to the first gimbal member along an axis which is substantially at right angles to the axis of the pivots 10. The gimbal member 12 is a pan-shaped member mounted substantially concentric with the sphere of the compass, and made of thin gage aluminum, magnesium or other very light non-magnetic material. As pointed out in said patent, the pan-shaped gimbal 12 provides the largest practical amount of surface lying in an equatorial plane so that it is acted upon by approximately equal volumes of liquid.

Supported on the gimbal member 12 is a compass card 16, this card having dependent therefrom by suitable means (such as the plate 19) the brackets 18, the brackets supporting a pair of bar magnets 20 to give the compass card its pole-seeking characteristics. (While a compass card is shown, other pole-seeking indication means could be used in place thereof.)

Figure 2:
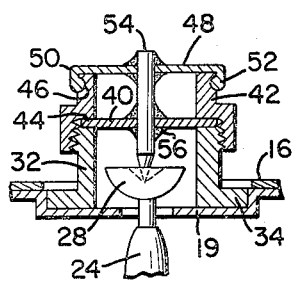
FIG. 2 is an elevation, partly in section and enlarged, of a portion of the FIG. 1 embodiment showing certain details thereof.

Referring now to FIG. 2, there is shown in enlarged detail a portion of the first embodiment of the improved mounting means for the car or indicator. Secured to the center of member 12 by a pair of clamping nuts 22 is a vertical metal post 24 having a depending portion threaded to receive a balancing weight 26. The post 24 projects upwardly as a hollow pillar receiving the stem of a jeweled pivot cup 28 or bearing member. Pivot cup 28 cooperates with a cone-pointed pivot 30.

Secured to the center portion of the plate 19 is a metallic sleeve 32 made of lightweight non-magnetic material such as aluminum, and having the outwardly turned flange 34. Attachment to the plate 19 may be made conventionally as by the screws 36 which pass through the plate 19 and are threaded into flange 34.

In this embodiment, a diaphragm 40 is provided and is held on the end of the sleeve 32 by means of the clamping cylinder 42 which is internally threaded to screw on the sleeve 32 and is provided with the internal shoulder 44 which engages the upper end of the sleeve 32 to hold the diaphragm 40 securely therebetween.

At the upper end of the cylinder 42 (on the outside thereof) there is provided a peripheral groove 46. A second flexible diaphragm 48 of the same kind of material as diaphragm 40 is provided, diaphragm 48 being so formed as to have a skirt 50, the rim of the skirt being turned inwardly to provide a flange 52 adapted to fit into the groove 46. The diaphragm is so dimensioned that when it is placed over the upper end of the cylinder 42, the flange 52 will snap into the groove 46, with the elasticity of the material of diaphragm 48 holding the diaphragm securely to the upper end of the cylinder 42. (Although this form of construction has been shown as a method of fastening diaphragm 48 to the cylinder 42, other ways can be found for so doing, such as by using, for example, a clamping ring.)

A pivot pin 54 is provided and is made sufficiently long so that it passes through the approximate center of each of the diaphragms 40 and 48, being fastened to each of these diaphragms by appropriate cementing material indicated by numeral 56, its pointed end engages rotatably the jewel cup 28 when the compass card is mounted thereon.

It will be observed that in this construction, the combination of the two diaphragms 40 and 48 permit vertical compliance of the mounting for the pivot, that is, a compliance which extends axially of the pivot pin, and yet still provides a radial resilience which has been mentioned above in connection with the FIG. 2 embodiment. However, with this construction, which is the preferred construction, there is a minimum of rotational resilience, the latter term being used herein to mean resilience about an axis radial to the pivot pin at the point where the latter traverses the respective diaphragms. An advantage of the FIGS. 1 and 2 embodiments is that because the rotational compliance is minimized in this embodiment, the material of the diaphragms 40 and 48 can be made more resilient, and the diaphragms themselves can be thinner in order to get more vertical compliance.

Figure 3:
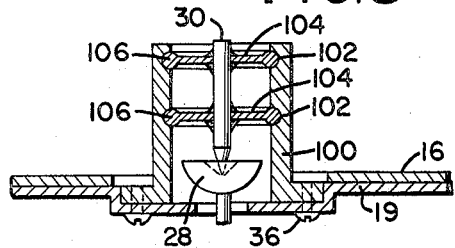
FIG. 3 is an elevation, partly in section, of a portion of a second embodiment of the invention.

Referring to FIG. 3 there is shown a portion of an embodiment of the invention in which a pair of diaphragms are used and which are attached to the compass card or indicator 16, as follows: the mounting plate 19 of the previous embodiment is used, and has attached thereto the mounting sleeve 100 which is attached to the mounting plate as shown and described in the FIG. 1 embodiment. In this instance, the sleeve 100 is elongated, and on the inner wall thereof are provided a pair of spaced peripheral grooves 102.

A pair of diaphragms 104 is provided, these diaphragms being molded of the flexible material as set forth for the other embodiment, and each diaphragm comprising a disc shaped member having a perimeter with a toroidally-shaped outer rim 106 the latter being shaped to fit the grooves 102, and the diaphragms being dimensioned so that the rim 106 may be snapped into the grooves as shown in the illustration. Passing through the approximate centers of the diaphragms 104 is the pivot pin 30, the latter being attached to the diaphragms either by suitable cement, as shown, or by clamping nuts. As in FIG. 2, a jewel cup 28 is provided suitably supported on the gimbal member 12 (not shown in this view).

As with the FIGS. 1 and 2 embodiments, the use of the two diaphragms gives ample vertical compliance and does not have the rotational compliance which in some instances may need to be minimized.

In the several views, the relative parts have in some instances been exaggerated as to their thicknesses, for clarity of illustration. Also, in order to clarify the drawings, these parts have been set forth relatively further apart than they would be as used in a compass. In respect to this, the remarks found in said Patent 2,428,346 are pertinent in regard to the counter balancing weight 26 and its adjustment, and the fact that for optimum performance in the spherical compass of said patent the point of the pivot pin in the various embodiments and the compass card, should all lie normally in the equator of the bowl. However, the advantages of this invention are not dependent on the precautions as set forth in said patent, since the basic feature of this invention is to provide the resilient support as described.

As indicated in said Patent 2,428,346, the bowl of the compass may be filled with a damping fluid in order to damp unwanted oscillations of the compass card and stabilize it for a given reading. It is to be noted that the material of the elastomer used as the diaphragm in the several embodiments should be a material compatible with the kind of damping fluid used. The selection of the proper material of the diaphragm to be compatible with the damping fluid is within the skill of the art.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Having described the invention, what is claimed is:

1. A compass comprising a base, a first gimbal member mounted on pivots to swing with respect to the base in a first axis; a second gimbal member pivoted to the first gimbal member to swing with respect thereto in a second axis at right angles to said first axis; a compass card having pole-seeking characteristics; support means rotatably supporting the card on said second gimbal member, the support means comprising a pivot having a pointed end, a jewel cup receiving said pointed end for rotation of the pivot with respect to the cup, and a pair of flexible diaphragms lying across the axis of the pivot and each having a central portion and a peripheral portion, said diaphragms being spaced apart and being approximately parallel to each other, the peripheral portion of each diaphragm being attached to said card, and the central portions of each diaphragm being attached to one of the pivot and jewel cup but not to the other; a shell attached to said base and enclosing the gimbal member, the card, the pivot, the jewel cup and the diaphragms, the shell being filled with a damping fluid for damping motion of the card with respect to the second gimbal member, and the shell having at least a portion which is transparent to permit observance of the card from outside the shell.

2. A compass comprising a base, a first gimbal member mounted on pivots to swing with respect to the base in a first axis; a second gimbal member pivoted to the first gimbal member to swing with respect thereto in a second axis at right angles to said first axis; a compass card having pole-seeking characteristics; support means rotatably supporting the card on said second gimbal member, the support means comprising a pivot having a pointed end, a jewel cup receiving said pointed end for rotation of the pivot with respect to the cup, and a pair of continuous flexible diaphragms lying across the axis of the pivot and each having a central portion and a peripheral portion, said diaphragms being spaced apart and being approximately parallel to each other throughout their entire areas, the entire peripheral portion of each of the flexible diaphragms being attached to said card and the central portion of each of the flexible diaphragms being attached to one of the pivot and jewel cup but not to the other; a shell attached to said base and enclosing the gimbal member, the card, the pivot, the jewel cup, and the diaphragms, the shell being filled with a damping fluid for damping motion of the card with respect to the second gimbal member, and the shell having at least a portion which is transparent to permit observance of the card from outside the shell.

References Cited

UNITED STATES PATENTS

| 1,980,415 | 11/1934 | Lumm. | |
| 2,026,919 | 1/1936 | Stright | 33—223 |
| 2,428,346 | 9/1947 | White. | |
| 2,903,798 | 9/1959 | Taylor | 33—223 X |

FOREIGN PATENTS

| 539,845 | 4/1922 | France. |
| 713,657 | 11/1941 | Germany. |
| 1,670 | 7/1854 | Great Britain. |
| 1,884 | 8/1854 | Great Britain. |
| 4,883 | 3/1908 | Great Britain. |
| 116,806 | 6/1918 | Great Britain. |
| 268,124 | 3/1927 | Great Britain. |
| 507,889 | 6/1939 | Great Britain. |

ROBERT B. HULL, Primary Examiner